United States Patent [19]

Cunningham

[11] Patent Number: 4,950,458
[45] Date of Patent: Aug. 21, 1990

[54] PASSENGER AUTOMOTIVE RESTRAINT GENERATOR

[75] Inventor: Donald J. Cunningham, North Ogden, Utah

[73] Assignee: Morton International, Inc., Chicago, Ill.

[21] Appl. No.: 369,874

[22] Filed: Jun. 22, 1989

[51] Int. Cl.$^5$ .............. B01J 7/100; A62B 35/04; B60R 21/26; C06D 5/06
[52] U.S. Cl. .............. 422/164; 422/166; 422/113; 422/117; 422/126; 422/238; 422/239; 422/305; 280/741; 280/742; 280/736; 102/530; 102/531
[58] Field of Search ............... 422/164, 166, 117, 113, 422/126, 238, 239, 305; 102/530, 531; 280/741, 742, 736, 737, 732

[56] References Cited

U.S. PATENT DOCUMENTS

| | | | |
|---|---|---|---|
| 4,213,635 | 7/1980 | Inokuchi et al. | 280/742 |
| 4,358,998 | 11/1982 | Schneiter et al. | 102/530 |

Primary Examiner—Robert J. Warden
Assistant Examiner—A. Singla
Attorney, Agent, or Firm—Gerald K. White

[57] ABSTRACT

An impact extruded perforated aluminum housing contains a two-stage gas generator having a perforated bulkhead positioned between the stages. Each stage includes a combustion chamber having an igniter and pyrotechnic charge therein with cooling and filter screens surrounding the combustion chamber. The igniter of the first stage is fired by a squib responsively to an external electrical signal. A rupturable barrier and a ball valve associated with the bulkhead control the flow of gas through the bulkhead and provide mechanical timing for ignition delay in the firing of the second stage after the first stage has been fired, and also provide pressure control after ignition of both stages to prevent repressurizing the first stage. A rupturable foil barrier surrounding the combustion chamber in the first stage promotes a rapid rise in pressure therein and thus breakout sooner therefrom of gas to an airbag to be inflated. A rupturable foil barrier surrounds the cooling and filter screens in the second stage and delays the breakout of gas therefrom to the airbag as the pressure rises, the rate of which pressure rise is less than that at which the pressure in the first stage rises. The thickness of the foil barrier surrounding the combustion and filter screens is selected to be sufficiently less than that of the foil barrier surrounding the first stage combustion chamber so as to achieve substantial equalization of pressure in the first and second stages.

11 Claims, 2 Drawing Sheets

PASSENGER AUTOMOTIVE RESTRAINT GENERATOR

BACKGROUND OF THE INVENTION

1. Field of the Invention

This invention relates to gas generators or inflators, and more particularly, to self-contained radial gas generators for inflating large passenger side occupant restraint airbags or crash bags where such generators utilize the combustion of solid gas generant compositions for the rapid generation of the inflating gas.

2. Description of the Prior Art

Self-contained, single stage gas generators or inflators for automobile passenger side airbags that utilize combustible solid gas generant compositions are known in the prior art. A radial form of such generator is disclosed in U.S. Pat. No. 4,296,084 that was issued on Oct. 20, 1981 to G.V. Adams et al., which patent is assigned to the assignee of the present invention. The disclosure of U.S. Pat. No. 4,296,084, by reference, is incorporated herein. Common features of such generators are the inclusion in a single combustion chamber of a gas generant composition containing a pelletized alkali metal azide and means to filter and to cool the gas positioned between the gas generant composition and gas discharge orifices or outlet holes, as defined by the inflator housing. Such gas generant compositions are considered advantageous for use in automobile airbag inflating applications because the product of the combustion is mainly nitrogen, an inert gas. The speed of reaction or burning of such compositions may be selected to be such as to effect the generation of gas at a very rapid rate but without detonation.

A problem has been encountered with single stage, that is, single combustion chamber, passenger side radial gas generators. The single combustion chamber passenger side radial generators known in the prior art tend to perform at an initial pressure rise rate which is greater than desirable in the zero to twenty (0 to 20) millisecond time frame after inflator initiation. The initial rapid pressure rise has been identified as a possible cause for injuries to an out-of-position occupant, and in particular, a child, during deployment of the airbag.

In U.S. Pat. No. 3,663,035 issued to Thomas W. Norton on May 16, 1972, there is disclosed a crash bag inflator comprising a two-stage gas generator, wherein a first stage is ignited to provide an initial deployment thrust at a time prior to ignition of a second stage. The two-stage gas generator, as described, consists of a pair of first and second inflators that are positioned in parallel relation, being held together by a tie bar. Each stage has one end attached to a block in which an ignition cavity common to both stages is provided. A fixed delay line operatively separates the second stage from the ignition cavity and delays ignition of the second stage by a few milliseconds. Both stages are said to be fully operative within less than ten (10) milliseconds of initiation by a pyrotechnic initiator responsively to a crash.

While described as providing a more controlled delivery of gas to an airbag without disadvantageously delaying the deployment thereof, the Norton two-stage gas generator structure is complex and bulky and requires a volume of space larger than desirable for installation on the dashboard of an automotive vehicle.

Thus, there is a need and a demand for improvement in passenger automotive restraint gas generators that have particular utility in protecting the out-of-position passenger and that are of maximum compactness, requiring a minimum volume of space for installation on the passenger side of an automotive vehicle. The present invention was devised to fill the technological gap that has existed in the art in this respect.

SUMMARY OF THE INVENTION

An object of the invention is to provide an improved automotive restraint gas generator which features simplicity and efficiency in the construction thereof that enables economic manufacture and assembly, and that is operative to effect a controlled delivery of a gas for inflating a passenger side airbag for providing protection for the out-of-position passenger.

Another object of the invention is to provide such an improved gas generator that is of maximum compactness and requires a minimum volume of space for installation in the dashboard of an automotive vehicle, on the passenger side thereof.

A further object of the invention is to provide a two-stage automotive restraint gas generator in which operation of a first stage responsively to an incipient collision is utilized by means of a delay body and ball valve to effect delayed initiation of a second stage, with the ball valve effecting a subsequent operation to stop repressurization of the first stage and thereby separating the action of the two stages.

Still another object of the invention is to provide such an improved two-stage gas generator in which the arrangement of the first stage is such as to provide rapid pressurization and release of inflation gas to the airbag and the arrangement of the second stage is such as to provide less rapid pressurization and release of inflation gas to the airbag thereby to increase the delay time between the actuations of the first and second stages.

In accomplishing these and other objectives of the invention, there is provided an improved automotive restraint gas generator having particular utility for use on the passenger side of an automobile or similar vehicle. The gas generator comprises an inflator having first and second stages arranged in end-to-end relation in the same housing. Specifically, each stage is assembled into an individually associated chamber in an impact extruded lightweight housing which may be made of aluminum. A barrier or bulkhead positioned in suitably sealed relation at an intermediate location within the housing separates the two chambers. A ball valve in the bulkhead provides mechanical timing for ignition delay between firing of the two stages and for pressure control after ingition of both stages to prevent repressurizing the first stage.

The improved generator is further characterized in that each stage includes suitable provisions for cooling and filtering and for maintaining a neutral or nonpropulsive thrust upon ignition.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specification, of which.

DESCRIPTION OF THE PREFERRED EMBODIMENT

Figure 1:
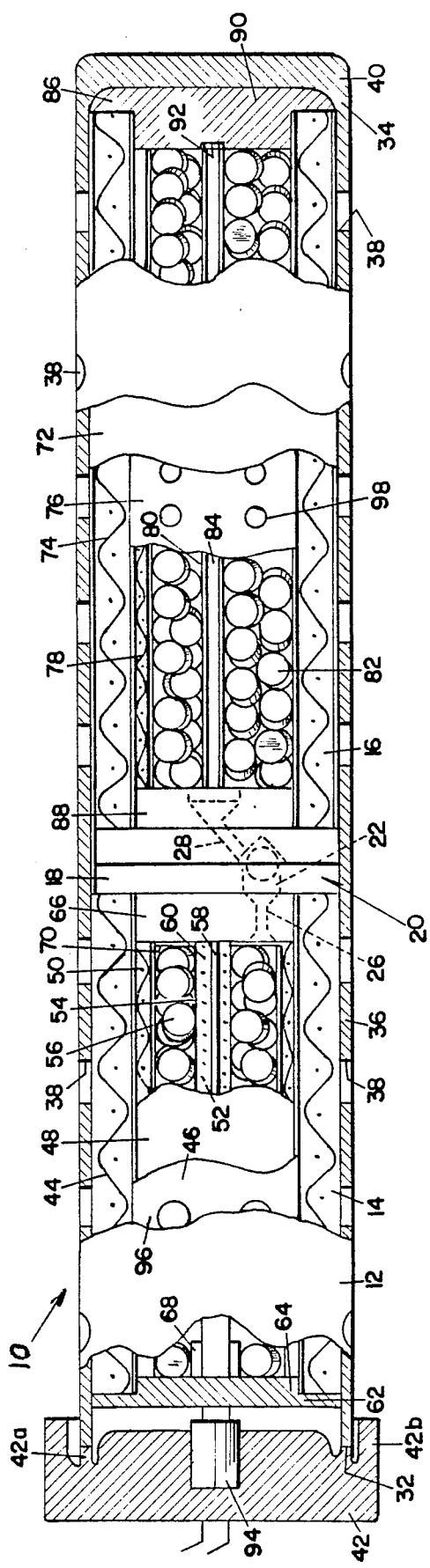
FIG. 1 is a longitudinal view, partly in section, of the dual chamber passenger automotive restraint gas generator according to the invention.

An automotive restraint gas generator according to the invention is illustrated in FIG. 1 of the drawings. The gas generator, designated by the reference numeral 10, includes a single impact extruded elongated tube or cylindrical housing 12. The extrusion process by which the housing 12 is formed is known to those skilled in the art and consists of shaping by forcing the material of which the housing is made through suitable dies under pressure. The extrusion process per se forms no part of the present invention, and therefore, will not further be described herein.

Housing 12 preferably is made of aluminum and contains first and second elongated cylindrical housing chambers 14 and 16, respectively, that are separated from each other by a perforated bulkhead 18, the outer periphery of the bulkhead 18 being suitably sealed by means (not shown) to the inner side of the wall of housing 12. The chambers 14 and 16 may be of equal length, or of unequal length as shown in the drawing, depending upon the performance required.

Figure 3:
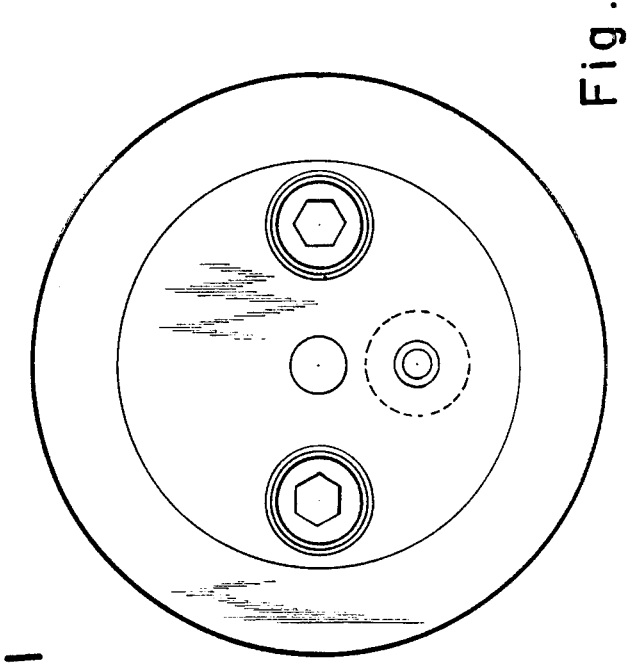
FIG. 3 is a view as seen from the left end of the bulkhead/ball valve of FIG. 2.
Figure 2:
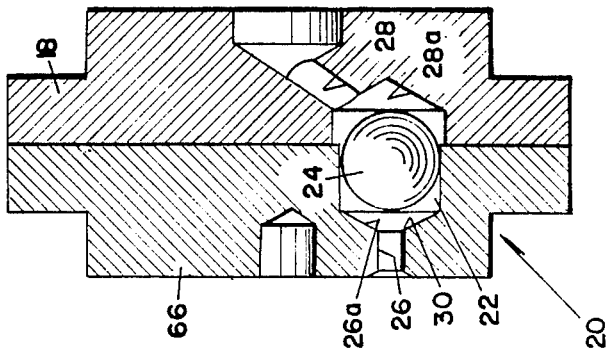
FIG. 2 is a plan view on an enlarged scale showing the bulkhead/ball valve of the gas generator of FIG. 1.

Bulkhead 18, which is shown enlarged and in greater detail in FIGS. 2 and 3, incorporates a ball valve comprising delay body 20 having a ball valve chamber 22 therein containing a ball 24. First and second openings 26 and 28 are connected to a passageway and further connect the ball valve chamber 22 to the housing chambers 14 and 16, respectively. The arrangement is such that a gaseous flow from chamber 14 to chamber 16, resulting from a pressure differential therebetween, forces the ball 24 toward the adjacent end 28a of opening 28 to restrict the gaseous flow into chamber 16, thus limiting any resulting diminishing of pressure in combustion chamber tube 46. Upon a reversal in that pressure differential, the resulting gaseous flow forces the ball 24 into engagement with a valve seat 30 on the adjacent end 26a of opening 26 and thereby stops such flow.

The housing 12 has a first end 32 and a second end 34 and includes a cylindrical wall 36 in which a plurality of outlet orifices or holes 38 are formed. Holes 38 may be formed in two rows on each side of the housing 12 along the length thereof, being positioned in uniformly spaced relation with respect to the housing chambers 14 and 16. The arrangement is such that the holes 38 of each row on one side of housing 12 are spaced approximately 180° with respect to the holes of one of the rows on the other side thereof. Such positioning of holes 38 in housing wall 36 assures neutral thrust in the event of accidental ignition of the generator 10 during shipping and storage, thus precluding the possibility, upon such occurrence, of the generator 10 jumping and becoming a projectile.

The ends 32 and 34 of housing 12 are closed in a sealing manner. Thus, the second end 34 of housing 12 is sealed by an end cap 40 which may be formed integrally therewith during the extrusion process. An end cap base 42, which may be made of aluminum, may be inertia welded to the first end 32 of the housing 12 in a manner described hereinafter.

Provided within the first housing chamber 14, radially inwardly thereof and arranged concentrically therein, in the order named, are cylindrical outer cooling and filter screens 44, a cylindrical perforated steel combustion chamber tube 46, a rupturable foil barrier 48 in engagement with the inner side of the wall of tube 46, an inner cylindrical combustion chamber screen 50, and a centrally located cylindrical perforated igniter tube 52 having a rupturable foil tape 54 wrapped around the outside thereof. The cooling and filtering screens 44 are positioned in surrounding relation to the combustion chamber tube 46. Positioned in the elongated annular space between the inner combustion chamber screen 50 and the igniter tube 52 is a gas generant charge or load comprising uniformly distributed pellets 56.

The foil barrier 48 and inner filtering screen 50 are positioned in surrounding relation to the gas generant charge 56 and igniter tube 52.

Contained within the igniter tube 52 is an elongated rapid detonating cord (RDC) fuze 58 which is surrounded by a booster charge 60 of igniter granules. The RDC fuze 58 is a high velocity ignition propagation cord that is manufactured by Teledyne McCormick Selph, 3601 Union Road, P. 0. Box 6, Hollister, California 95024-0006. The booster charge 60 of igniter granules surrounding the RDC cord may comprise a mixture of 25% boron powder and 75% potassium nitrate. The foil tape 54 contains the igniter granules within the perforated igniter tube during manufacture.

In accordance with one embodiment of the invention, for a reason explained further hereinafter, the thickness of the foil barrier 48 in engagement with the inner wall of combustion chamber tube 46 was selected to be 0.006 inches (0.015 centimeters).

The several enumerated components contained within the housing chamber 14 comprise the first stage of the gas generator 10 and are held firmly against radial and endwise movement within the chamber 14 by an end cap and perforated tube holder 62 that is positioned at the first end 32 of the housing 12 and by the delay body 20 of the bulkhead 18. Specifically, a portion 64 of the holder 62 extends in close fitting or snug relation into one end of the combustion chamber tube 46, and a portion 66 of the delay body 20 extends in close fitting or snug relation into the other end thereof. Similarly, one end of the igniter tube 52 is snugly received within a receptacle 68 provided on the holder 62, centrally thereof, and the other end abuts against the surface of portion 66 of the delay body 20 with a rupturable delay foil 70 interposed therebetween. The delay foil 70 provides a rupturable barrier to the flow of hot gases through the passageway 26 from the combustion chamber tube 46 and the igniter tube 52.

Provided within the second housing chamber 16, radially inwardly thereof and arranged concentrically, in the order named, are a rupturable foil barrier 72 on the inner side of wall 36 of housing 12, cylindrical outer cooling and filter screens 74, a cylindrical perforated steel combustion chamber tube 76, an inner cylindrical combustion chamber screen 78, and a centrally located elongated cylindrical perforated igniter tube 80. The foil barrier 72 and the cooling and filtering screens 74 are positioned in surrounding relation to the combustion chamber tube 76. Positioned in the annular space between the combustion chamber screen 78 and the igniter tube 80 is a gas generant charge or load comprising uniformly distributed pellets 82. The foil barrier 72 and the cooling and filtering screens 74 are positioned in surrounding relation to the combustion chamber tube 76.

Contained within the igniter tube 80 is an elongated cast or extruded booster charge 84 which may comprise a mixture of 25% boron and 75% potassium nitrate.

The thickness of the foil barrier 72 on the inner side of wall 36 of housing 12 in the aforementioned embodiment of the invention was selected to be 0.004 inches (0.010 centimeters).

The several enumerated components within the housing chamber 16 comprise the second stage of the gas generator 10 and are held firmly against radial and endwise movement within the chamber 16 by the delay body 20 of the bulkhead 18 and by an end cap and tube locator 86 that is positioned in the housing 12 at the second end 34 therof. Specifically, a portion 88 of the delay body 20 extends in close fitting relation into one end of the combustion chamber tube 76, and a portion 90 of the end cap and tube locator 86 extends in close fitting relation into the other end thereof. Also, one end of igniter tube 80 is received within a suitable opening 92 in the portion 90 of end cap and tube locator 86 with the other end thereof positioned adjacent the end of passageway 28 in delay body 20.

An electrically actuatable initiator assembly 94, which may comprise a conventional electric squib, is mounted in the end cap base 42 in sealing relation therewith and in alignment with the RDC fuze 58 at the adjacent end of the igniter tube 52.

The material of which the gas generant pellets 56 and 82 is made may be any one of a number of compositions meeting the requirements for burning rate, non toxicity, and flame temperature, a preferred material being that disclosed in U.S. Pat. No. 4,203,787 issued to Fred E. Schneiter et al. on May 20, 1980, the disclosure of which patent by reference is incorporated herein. Particularly preferred are compositions comprising from about 65 weight percent to about 70 weight percent metal azide, up to about 4 weight percent sulfur and from about 27 weight percent and about 33 weight percent molybdenum disulfide, especially a composition comprising about 68 weight percent sodium azide, about 2 weight percent sulfur and about 30 weight percent molybdenum disulfide.

As previously mentioned, the end cap base 42 may be inertia welded to the first end 32 of the housing 12. For facilitating the welding operation, the end cap base 42 includes a circular stub 42a that matches the end 32 of housing 12.

In the inertia welding operation, with the loaded housing 12 mounted in a suitable tailstock fixture (not shown) and the end cap base 42 mounted in an aligned suitable headstock fixture (not shown), the end cap base 42 is rotated by power clutch means (not shown) to a speed which may be about 1930 revolutions per minute. Upon the attainment of such speed, the power clutch means is actuated to disconnect the power source and the freely spinning end cap base 42 is moved toward the housing 12 to bring the circular stub 42a into contact with the housing end 32, with a force of about 630 pounds being applied. The resulting friction stops the spinning of the end cap base 42 in a fraction of a second but raises the temperature of the area sufficiently to cause consolidation thereat of the metal of the housing 12 and the end cap base 42. Pressure is maintained for a short period, for example, a second or two, to allow the weld to solidify. Upon completion of the weld, a circular apron 42b that overlaps the circular stub 42a may be rolled against the adjacent outer surface of the housing 12 at the end 32 thereof to conceal the weld.

In the operation of the gas generator 10, an electrical impulse from a crash sensor (not shown) fires the electrically actuatable initiator assembly 94. Firing of the assembly 94 results in ignition of the RDC fuze 58 which instantly sets off the booster charge 60 of igniter granules along the entire length of the perforated igniter tube 52. The foil tape 54 wrapped around the igniter tube 52 not only contains the igniter granules during manufacture but also provides uniform ignition thereof. Specifically, upon ignition of booster charge 60, the pressure of the resulting gas builds up until a threshold value is reached at which the foil tape 54 ruptures. This action promotes uniform ignition of the igniter granules prior to rupture and breakout of the hot gases produced by the ignited booster charge 60 into the load of gas generant pellets 56 contained within the perforated combustion chamber tube 46.

Upon such initiation of combustion of the gas generant pellets 56 in the perforated combustion chamber tube 46, the pressure of the resulting gas begins to rise until a peak is reached. The relatively thick foil barrier 48, which as noted hereinbefore is 0.006 inches thick, allows a rapid pressure build up. Prior to the attainment of peak pressure, however, during the combustion function time, the gas pressure reaches a threshold value at which the foil barrier 48 ruptures. Upon such rupture, the material of the foil barrier 48 is blown out of the way and the hot generated gas is allowed to flow through a plurality of holes 96 in the wall of combustion chamber tube 46, such gas flow being cleaned, that is, filtered, of solid particles of combustion by the inner combustion chamber screen 50. Holes 96 in the combustion chamber tube 46 preferably are provided in two rows on each side spaced along the length thereof, with the rows of holes 96 on both sides offset by approximately 90° from the rows of holes 38 in the wall 36 of housing 12.

The hot generated gas released through the holes 96 passes around and through the outer cooling and filter screens 44 and immediately through the holes 38 in the wall 36 of housing 12 into an air bag (not shown) to be inflated.

At the same time the hot generated gas under pressure in the combustion chamber tube 46 ruptures and breaks through the delay foil 70 on the surface of the portion 66 of the delay body 20. The hot gas then passes in sequence through the passageway 26, the ball valve chamber 22, and the passageway 28. An initial rush of such hot gas through the bulkhead 18 into the second stage of the generator 10 is quickly diminished due to movement of the ball 24 against the adjacent opening of passgeway 28. Such flow of hot gas sets off the booster charge 84 in the igniter tube 80 along the entire length thereof thereby to produce ignition of the gas generant pellets 82 in the perforated combustion chamber tube 76. Upon ignition of the gas generant pellets 82, the pressure of the resulting gas begins to rise. Prior to the attainment of peak pressure, however, during the combustion fucntion time, the gas pressure reaches a threshold value at which the foil barrier 72 on the inside of wall 36 of housing 12 ruptures.

Upon rupture of the barrier foil 72, the hot generated gas produced in the combustion chamber tube 76 is released and delivered to the airbag (not shown) through a plurality of holes 98 in the wall of tube 76, such gas being released immediately without encountering any further barriers although having to pass in sequence through the inner combustion chamber screen 78 for filtering and through the outer cooling and filtering screens 74 for cooling and additional filtering.

At the same time, the pressurization of the gases in the second stage forces the ball 24 of the delay body and ball valve to reverse, that is, to move through the ball valve chamber 22 into engagement with the ball valve seat 30 at the end of passageway 26. This cuts off the flow of gas from the second stage into the first stage and thus stops repressurization of the first stage, and makes the action that of two separate gas generators with a delay time between the two, in one embodiment of the invention, being approximately 15 milliseconds. A barrier foil 72 having a thickness of 0.004 inches, which is less than that of the barrier foil 48 in the first stage, is selected so that the rupture thereof to effect release of the gas to an airbag occurs when the pressure in the two stages are approximately equal, thereby balancing the pressures of the two stages.

Figure 4:
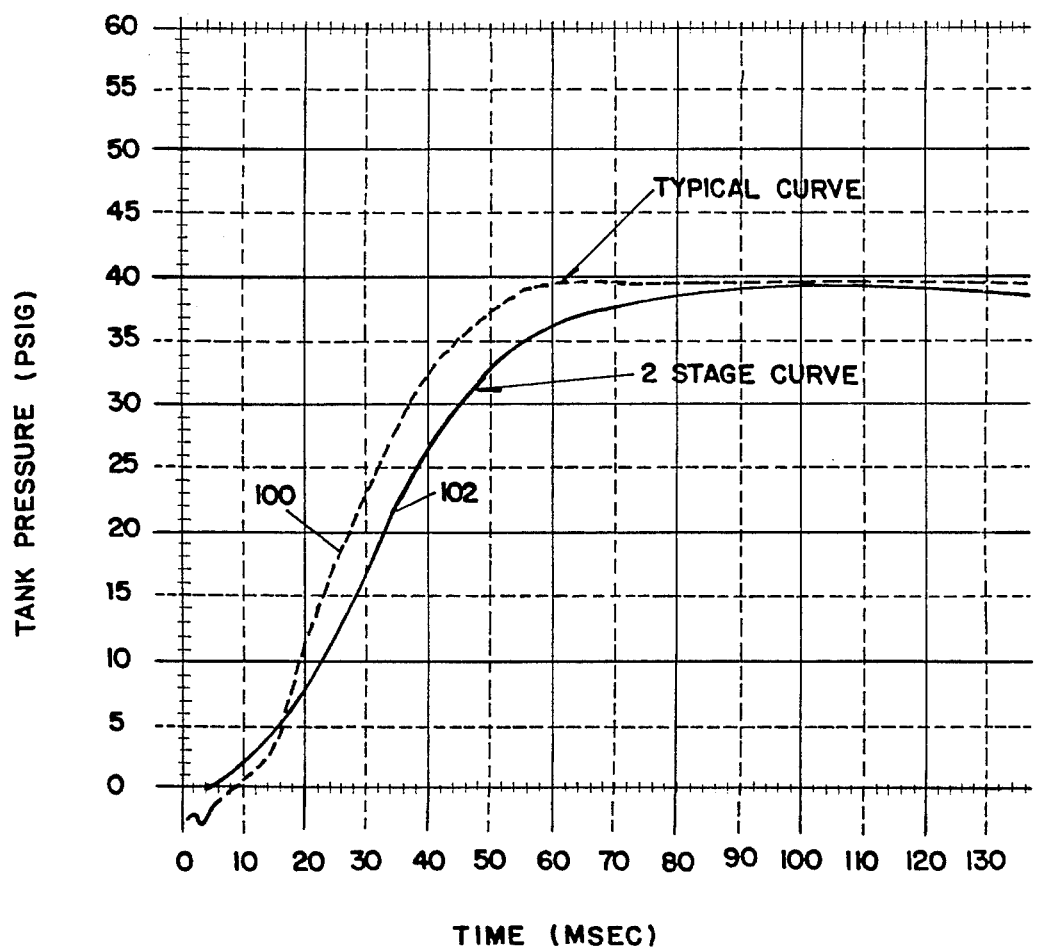
FIG. 4 is a graphic comparison of the pressure rise rate of a typical single-stage gas generator and the two-stage gas generator according to the present invention.

In FIG. 4 there is graphically illustrated a comparison of the performance of a typical single stage passenger gas generator and the two-stage gas generator according to the invention. Curve 100 in FIG. 4 shows the performance of a typical single stage passenger gas generator, that is, the rate at which the generator output pressure rises. Curve 102 shows the pressure rise rate of a physical embodiment of the two stage generator 10 according to the invention.

As shown by curve 100 of FIG. 4, there is a delay of about 9 milliseconds from the instant of gas generator initiation (represented by the intersection of the horizontal and vertical axes of the graph) before the pressure begins to rise in the single stage generator. In the next 11 milliseconds the pressure rise rate is seen to be very steep, resulting in a "TANK" or airbag pressure in a 100 liter tank of about 11 pounds per square inch gauge (PSIG) 20 milliseconds after initiation. The pressure rise rate continues to be very steep, although moderating somewhat at 40 milliseconds from initiation, resulting in a maximum pressure of almost 40 PSIG at 60 milliseconds from initiation.

In the two-stage gas generator 10, according to the invention, the delay from the instant of initiation before the pressure begins to rise is shown by curve 102 to be about 4 milliseconds. At the end of 20 milliseconds from initiation, the tank pressure, as shown by curve 102, is 7.5 PSIG, as compared to 11 PSIG for the typical gas generator as shown by curve 100. This initial relatively low pressure rise for the generator 10 occurs since the output pressure thereof during the initial 20 millisecond time frame is due, at least primarily, to the operation of the first stage only.

Initiation of operation of the second stage of generator 10 at the end of the initial 20 millisecond time frame causes the tank pressure to rise at a steeper rate to produce a pressure of 27.7 PSIG at the end of 40 milliseconds. Thereafter, the rate of pressure rise gradually diminishes until at the end of 60 milliseconds the pressure is 36.5 pounds with maximum pressure of 39.8 PSIG occurring at 92.9 milliseconds from initiation.

Thus, in accordance with the invention, there is provided a two-stage gas generator in which the operation of the first stage is effective to provide rapid pressurization and release of inflation gas to an airbag and in which the operation of the second stage is effective to provide less rapid pressurization and release of inflation gas to the airbag, thereby increasing the delay time between the actuation of the two stages.

A feature of the invention is the incorporation in the two-stage gas generator 10 of two methods for effecting delay in the initiation and operation of the second stage after initiation and operation of the first stage responsively to an incipient crash, the delays produced by these methods being accumulative. The first method involves the use of the delay body 20 and ball valve including ball 20, ball valve chamber 22, passageways 26 and 28 and delay foil 70 on the surface of delay body 20 for delaying the initiation in operation of the second stage.

The second method for effecting a delay between the actuation of the two stages of generator 10 involves the use of the foil barrier 72 in engagement with the inside of wall 36 of housing 12 for delaying the breakout of hot gases from the second stage after ignition of the load of gas generant pellets 82 therein. As noted, no barrier of foil is provided on the inside of wall 36 of housing 12 in the first stage. As a result, there is a fast breakout of hot gases from the first stage through holes 38 in wall 36 upon rupture of the foil barrier 48 in engagement with the inside of the wall of the combustion chamber tube 46. Thus, the first stage is operative to begin delivery of gas to the airbag at a time sooner than it would if a barrier foil were provided on the inside of wall 36. The subsequent pressurization of the second stage following initiation thereof by the gas flow through the ball valve openings 26 and 28 forces the ball 24 to reverse and sit on the ball valve seat 30. This stops repressurization of the first stage and makes the action of the two stages that of two separate gas generators with a delay time between the two of approximately 15 milliseconds.

Other features of the invention comprise:
(a) The use of a lightweight aluminum housing together with a combination of components that lend themselves to economical manufacture and ease of assembly therein.
(b) The bulkhead/ball valve structure provides mechanical timing for ignition delay between the first and second stages of the gas generator and pressure control after ignition of the second stage to prevent repressurization of the first stage.
(c) The provisions made for gas diversion for cooling and filtering and the maintenance of a neutral thrust unit.
(d) The cast or extruded boron nitrate booster charge in the igniter for the second stage of the generator 10 eliminates the need therein for igniter granules and an igniter fuze. Also eliminated is the need for an aluminum foil to retain the igniter granules.

With this description of the invention in detail, those skilled in the art will appreciate that modifications may be made to the invention without departing from its spirit. Therefore, it is not intended that the scope of the invention be limited to the specific embodiments illustrated and described. Rather, it is intended that the scope of the invention be determined by the appended claims and their equivalents.

What is claimed is:

1. A gas generator comprising,
   a single impact extruded perforated elongated housing having a first end and a second end,
   an end cap base enclosing said first end of said housing,
   an end cap enclosing said second end of said housing,
   a perforated bulkhead positioned at an intermediate location within said housing, said bulkhead forming first and second elongated chambers within said housing and having formed therein a ball valve including a ball valve chamber and first and second openings connecting said ball valve chamber to said first and second elongated chambers, respectively, with the entrance to said second chamber being denoted a first position and the entrance to said first chamber being denoted a second position, said ball valve chamber housing a ball therein that is movable,
   whereby, said ball is operable to move between said first and second positions to restrict flow of gas through said bulkhead,
   whereby, at a second instant, said first chamber is pressurized, forcing said ball of said ball valve into said first position, suppressing gas flow into the second chamber and thereby insulating said first chamber from said second chamber,
   whereby, at a third instant, a pressure drop in said first chamber loosens engagement of said ball of said ball valve in said ball valve chamber from said first position and increased pressure in said second chamber forces said ball into said second position and isolates said second chamber from said first chamber,
   first and second elongated gas generating charges of solid pyrotechnic material contained in said first and second elongated chamber, respectively,
   first and second elongated perforated igniter tubes provided in operative relation with said first and second elongated gas generating charges, respectively, each of said perforated igniter tubes having a first end and a second end, and
   an initiator provided in operative relation with only one of said perforated igniter tubes.

2. The gas generator as defined by claim 1,
   wherein said initiator is provided in operative relation with said first gas generating charge.

3. The gas generator as defined by claim 2,
   wherein said perforated elongated housing has a cylindrical wall with a plurality of outlet holes formed therein along the length thereof in at least two rows on each of the opposite sides of said housing, and further including,
   first and second elongated perforated combustion chamber tubes each of which has a first end and a second end and an inner wall,
   first and second elongated filter screens,
   first and second elongated rupturable foil barriers,
   first and second elongated cooling and filter screens each of which has a first end and a second end,
   wherein said first and second elongated gas generating charges are contained within said first and second combustion chamber tubes, respectively,
   wherein said first and second filter screens are provided in surrounding relations to said first and second gas generating charges, respectively, within the respectively associated perforated combustion chamber tube,
   wherein said first foil barrier is provided in surrounding relation to said filter screen and gas generating charge in said first perforated combustion chamber tube, and
   wherein said first and second elongated cooling and filter screens are provided in surrounding relation to said first and second combustion chamber tubes, respectively, and
   wherein said second foil barrier is provided in surrounding relation to said second cooling and filter screens.

4. The gas generator as defined by claim 3 wherein the thickness of said first foil barrier is 0.006 inches (0.015 centimeters) and the thickness of said second foil barrier is 0.004 inches (0.010 centimeters).

5. The gas generator as defined by claim 4 wherein said elongated housing is made of aluminum and each of said first and second perforated tubes is made of steel.

6. The gas generator as defined by claim 3 further including
   and end cap and tube holder positioned at the first end of said elongated housing,
   an end cap and tube locator positioned at the second end of said elongated housing, and
   a rupturable elongated third foil barrier,
   said end cap and tube holder having a projecting portion that extends into said first end of said first perforated combustion chamber tube,
   said bulkhead having a first portion thereon that extends in snug relation into said second end of said first perforated combustion chamber tube,
   said third foil barrier being positioned in operative relation with said first portion of said bulkhead to normally preclude the flow of gas through said first passageway,
   said end cap and tube holder having a receptacle thereon that receives and locates the first end of said first perforated igniter tube,
   said second end of said first perforated igniter tube being positioned in abutting relation with said second portion of said bulkhead with said third foil barrier interposed therebetween,
   said end cap and tube locator having a projecting portion that extends in snug relation into said second end of said second perforated combustion chamber tube,
   said bulkhead having a second portion thereon that extends in snug relation into said first end of said second perforated combustion chamber tube, and
   said end cap and tube locator having a receptacle on said projecting portion thereof for receiving and locating said second end of said second perforated igniter tube.

7. The gas generator as defined by claim 6 wherein said end cap and tube holder includes another portion that retains the first end of said first cooling and filter screens with the second end of said first cooling and filter screens positioned in abutting relation with said bulkhead, and
   wherein said end cap and tube locator includes another portion that retains the second end of said second cooling and filter screens with the first end of said second cooling and filter screens positioned in abutting relation with said bulkhead.

8. The gas generator as defined by claim 7 further including an end cap base provided in sealing relation at the first end of said housing, said end cap base containing said initiator therein in sealed relation therewith.

9. The gas generator as defined by claim 8 wherein said initiator includes an electric squib having electrical connections leading externally of said end cap base and of said housing.

10. The gas generator as defined by claim 9 wherein said end cap base is inertia welded to said first end of said housing.

11. The gas generator as defined by claim 9 wherein the perforations in each of said first and second combustion chamber tubes comprise a plurality of holes formed along the length thereof in at least two rows on each of the opposite sides thereof with such rows of holes being positioned at approximately a right angle with respect to the rows of outlet holes formed in said housing.

* * * * *